US007275176B2

United States Patent
Stone-Kaplan et al.

(10) Patent No.: US 7,275,176 B2
(45) Date of Patent: Sep. 25, 2007

(54) AUTOMATIC RECONNECT AND REACQUISITION IN A COMPUTER INVESTIGATION SYSTEM

(75) Inventors: Kimberly A. Stone-Kaplan, Sherman Oaks, CA (US); Matthew Steven Garrett, Whittier, CA (US)

(73) Assignee: Guidance Software, Inc., Pasadena, CA (US)

( * ) Notice: Subject to any disclaimer, the term of this patent is extended or adjusted under 35 U.S.C. 154(b) by 0 days.

(21) Appl. No.: 11/590,370

(22) Filed: Oct. 30, 2006

(65) Prior Publication Data

US 2007/0043967 A1 Feb. 22, 2007

Related U.S. Application Data

(63) Continuation of application No. 11/378,948, filed on Mar. 16, 2006, now Pat. No. 7,168,000.

(60) Provisional application No. 60/662,968, filed on Mar. 16, 2005.

(51) Int. Cl.
*G06F 11/00* (2006.01)

(52) U.S. Cl. .......................................... 714/4; 709/227

(58) Field of Classification Search ...................... None
See application file for complete search history.

(56) References Cited

U.S. PATENT DOCUMENTS 6,163,692 A * 12/2000 Chakrabarti et al. ........ 455/416

| 6,360,247 | B1 * | 3/2002 | Fujishiro et al. ............ 709/203 |
| 6,564,261 | B1 * | 5/2003 | Gudjonsson et al. ....... 709/227 |
| 2002/0090947 | A1 | 7/2002 | Brooks et al. |
| 2005/0198379 | A1 * | 9/2005 | Panasyuk et al. ........... 709/239 |

* cited by examiner

*Primary Examiner*—Nadeem Iqbal
(74) *Attorney, Agent, or Firm*—Christie, Parker & Hale, LLP

(57) ABSTRACT

An examining machine automatically reconnecting to a target machine and resuming acquisition of data stored in a device coupled to the target machine. The examining machine establishes connection with the target machine and initiates data acquisition of the device coupled to the target machine. Periodically during the data acquisition, the examining machine receives from the target machine an intermediary hash state of the data that has been acquired so far. When connection is lost during the acquisition, the examining machine is able to automatically attempt reconnection to the target machine. Once the connection is automatically reestablished, the examining machine transmits the hash state that is currently saved for the acquisition to the target machine. The target machine may then continue the hash process from this intermediate state. That is, the target machine is able to continue generating a hash value for the entire acquisition without rehashing previously acquired data because that previously acquired data is already reflected in the intermediate hash state.

21 Claims, 8 Drawing Sheets

AUTOMATIC RECONNECT AND REACQUISITION IN A COMPUTER INVESTIGATION SYSTEM

CROSS-REFERENCE TO RELATED APPLICATION(S)

This application is a continuation of U.S. Pat. No. 7,168,000, which claims the benefit of U.S. Provisional Application No. 60/662,968, filed on Mar. 16, 2005, the content of which are incorporated by reference as if set forth in full herein.

FIELD OF THE INVENTION

This invention relates generally to computer investigation systems, and more specifically, to a system and method for automatically reconnecting and automatically resuming acquisition of a target device if connection is lost during an online investigation of the target device.

BACKGROUND OF THE INVENTION

U.S. Pat. No. 6,792,545, assigned to the Assignee of the present application, discloses a system and method for performing secure investigations of networked devices over a computer network. Such an online investigation generally entails acquiring dynamic and/or static data stored in a target device being investigated. It is quite possible, however, that a connection with the device may be lost before the investigation is over. Although mechanisms exist for automatically reconnecting to the device upon such a loss of connection, the restarting of the acquisition is a manual process. Furthermore, in the prior art, the acquisition is resumed from the beginning of a device that was being acquired regardless of how far the system was in the acquisition process when the connection was lost. This may cause portions of the device already processed prior to the loss of connection to be reprocessed when the reconnection is made.

Accordingly, what is desired is a system and method in a computer investigations system for not only automatically reconnecting to a target device, but also automatically restarting any acquisition, previously in progress, of data stored in the device while minimizing the reprocessing of the data when a reconnection is made.

SUMMARY OF THE INVENTION

The present invention is directed to a system and method for automatically reconnecting to a target machine and resuming acquisition of data stored in a device coupled to the target machine. An examining machine establishes connection with the target machine and initiates data acquisition of the device coupled to the target machine. The examining machine detects loss of connection with the target machine during the data acquisition. Upon sensing the lost connection, the examining machine attempts and automatically reconnects to the target machine. Once the connection is automatically reestablished, the examining machine identifies a position of the device from which the data acquisition is to be resumed, and automatically resumes the data acquisition starting from the identified position. The identified position causes reacquisition of at most a portion, but not all, of data already acquired prior to the loss of connection.

According to one embodiment, the examining machine periodically receives from the target machine an intermediate representation of a digital signature associated with the device. The intermediate representation is based on data acquired up to a current position. The intermediate representation is then stored in the examining machine's memory.

According to one embodiment, the examining machine, responsive to the detected loss of connection, identifies the current position, sets the position of the device from which the data acquisition is to be resumed to a next position following the current position, retrieves the stored intermediate representation; transmits the intermediate representation to the target machine, and requests data associated with the next position.

According to one embodiment, the intermediate representation is a hash state for data acquired up to the current position.

According to one embodiment, the target machine receives the hash state and updates the hash state based on a hash calculation of the data associated with the next position.

According to one embodiment, the examining machine establishes a secure communication with the target machine. This includes receiving a first encryption key generated by the target machine; generating a second encryption key; and transmitting the second encryption key to the target machine, wherein the second encryption key is encrypted via the first encryption key.

According to one embodiment, the examining machine receives from the target machine data encrypted using the second encryption key.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

In general terms, embodiments of the present invention are directed to a system that allows the acquisition of data stored in a remote device via an electronic connection. During the acquisition, a digital signature of the data that has been acquired so far is generated so that at the end of the acquisition, the digital signature is the digital signature of the entire acquisition. Such a digital signature ensures integrity of the data acquisition.

According to embodiments of the present invention, when the connection is lost in the middle of the acquisition and that connection is then regained, the process for generating the digital signature need not resume from the beginning, which would require reprocessing of all the previously acquired data. Instead, the process of generating the digital signature may resume from an intermediate state. This means that once the connection is regained, the data that needs to be acquired and processed for the generating of the digital signature is only the data that is not reflected in the intermediate state. This results in savings in processing time and resources for the digital signature generation.

Figure 1:
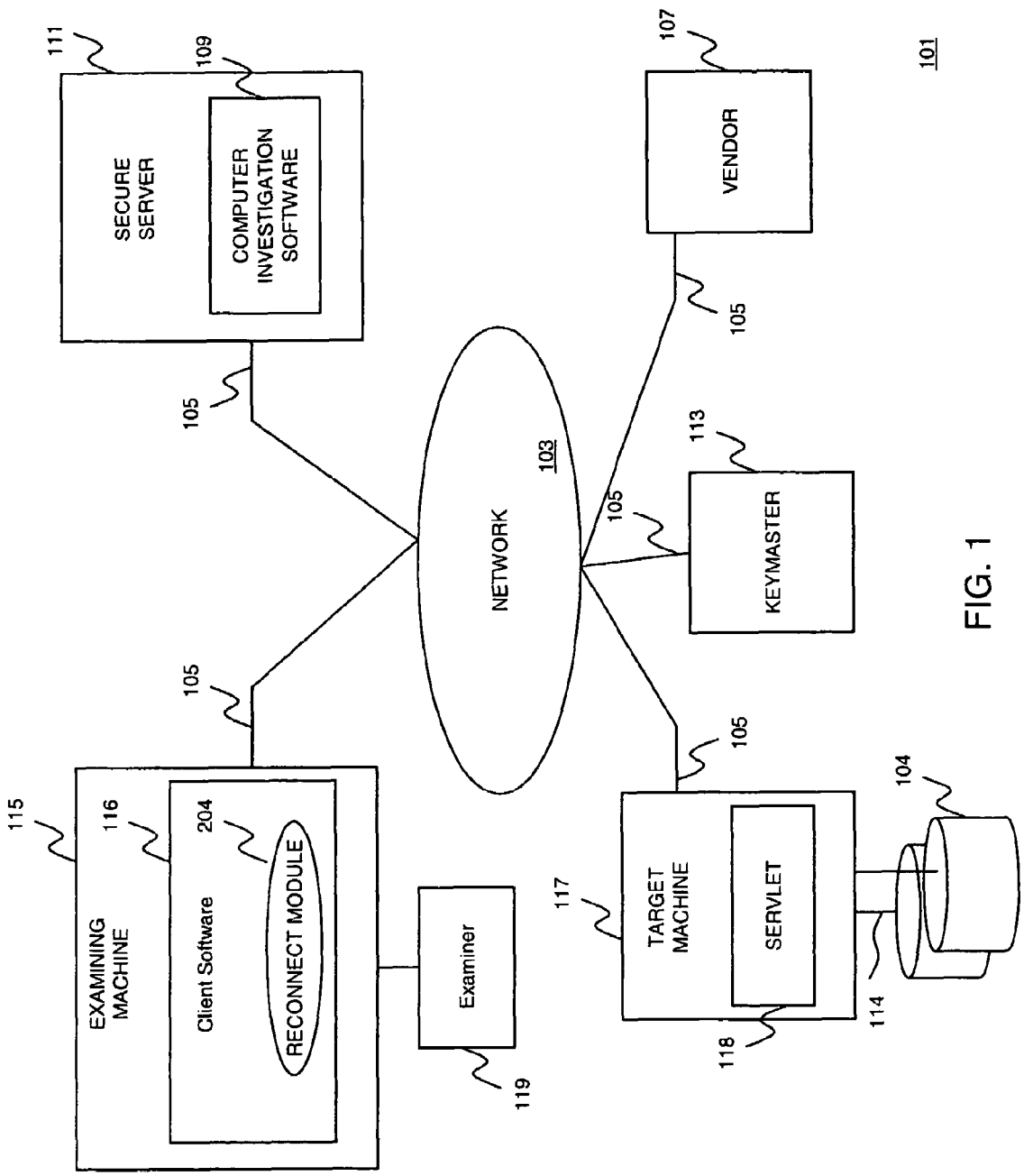
FIG. 1 is a block diagram of an exemplary computer investigation system according to one embodiment of the invention.

FIG. 1 is a block diagram of an exemplary computer investigation system 101 according to one embodiment of the invention. The computer investigation system 101 includes various network devices coupled to a data communications network 103 over data communication links 105. The data communications network 103 may be a computer network, such as, for example, a public Internet, a private wide area network (WAN), a local area network (LAN), or other wired or wireless network environment conventional in the art. The network devices may include a vendor computer 107, a secure server 111, an examining machine 115, one or more target machines 117, and a keymaster computer 113. The data communication link 105 may be any network link conventional in the art, such as, for example, an Ethernet coupling.

A vendor having access to the vendor computer 107 provides the organization with a computer investigation software 109 which enables the organization to effectively perform forensic investigations, respond to network safety alerts, and conduct network audits over the data communications network 103. The computer investigation software 109 may also allow other investigations of networked devices in addition to forensic investigations as evident to those of skill in the art.

The investigation software is installed in a local memory of the secure server 111 allocated to the organization. According to one embodiment of the invention, the computer investigation software 109 provides computer program instructions which, when executed by one or more processors resident in the secure server 111, cause the secure server to broker safe communication between the examining machine 115 and the target machines 117. The computer investigation software further facilitates the administration of users, logs transactions conducted via the server, and controls access rights to the system.

The examining machine 115 (which may also be referred to as the client) allows an authorized examiner 119 to conduct searches of the target machines 117 and their associated secondary storage devices 104. In this regard, the examining machine 115 includes a client software 116 which includes the functionality and interoperability for remotely accessing the secure server 111 and corresponding target machines 117.

According to one embodiment of the invention, the client software 116 includes a reconnect module 204 and associated graphics user interface (GUI). The reconnect module 204 is automatically invoked upon loss of connection with the target machine 117 during an investigation of the target machine. The reconnect module is configured to automatically reconnect with the target machine 117 and automatically restart acquisition of data from a particular device coupled to the target machine.

The reconnect module 204 may be implemented as a software module stored in memory that is executed by one or more processors resident in the examining machine 115. The reconnect module may include one or more sub-modules dedicated to the reconnection, reacquisition, and/or user interface to set up the parameters for the reconnection and reacquisition. Furthermore, the reconnect module 204 may be included as part of the client software 109, or reside as a module separate from the client software.

Each target machine 117 is exemplarily the subject of a computer investigation conducted by the examining machine 115. Each target machine 117 is coupled to one or more secondary storage devices 104 over an input/output connection 114. The storage devices include any nonvolatile storage media such as, for example, hard disks, diskettes, Zip drives, redundant array of independent disks (RAID) systems, holographic storage devices, and the like.

According to one embodiment, a servlet 118 installed on a particular target machine 117 responds to commands provided by the examining machine 115 to remotely discover, preview, and acquire dynamic and/or static data, and transmit the acquired data to the examining machine via the secure communication path created between the target machine and the examining machine. The servlet may be implemented as any software module conventional in the art, and is not limited to applets in a web browser environment.

The computer investigation system 101 illustrated in FIG. 1 further includes an examiner who has direct or remote access to the examining machine 115 via an examiner device 119 in any manner conventional in the art. The examiner device 119 may be an input and/or output device coupled to the examining machine 115, such as, for example, a keyboard and/or monitor. The examiner device 119 may alternatively be a personal computer or laptop communicating with the examining device over a wired or wireless communication mechanism. According to one embodiment of the invention, the examiner is a trusted individual who safely stores in the examining machine 115, one or more encryption keys used for authenticating to the secure server 111 and conducting the secure investigation of the target machines 117, as is described in more detail in the above-referenced U.S. Pat. No. 6,792,545.

Figure 2:
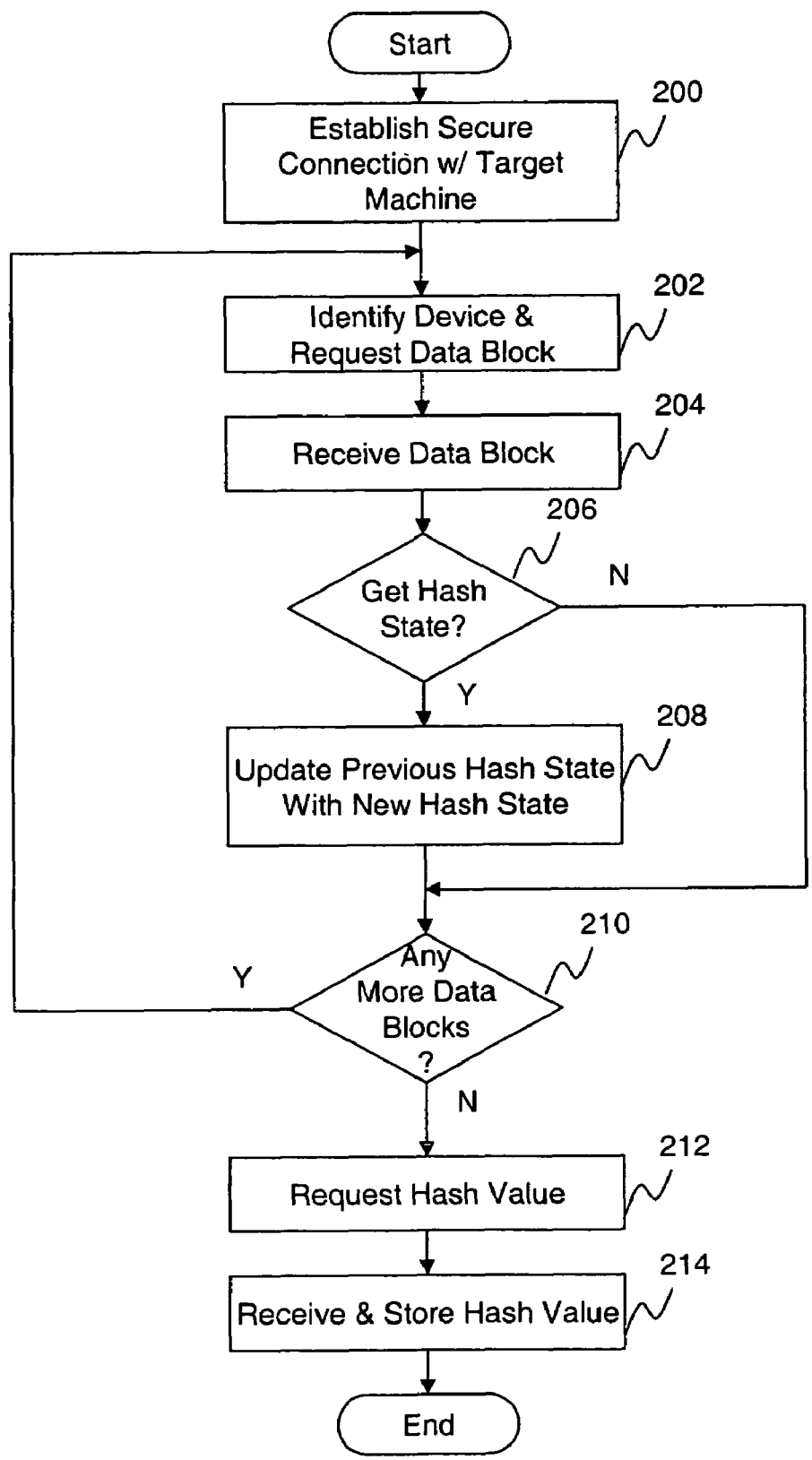
FIG. 2 is a flow diagram of a data acquisition process executed by an examining machine prior to any loss of connection with a target machine being investigated according to one embodiment of the invention.

FIG. 2 is a flow diagram of a data acquisition process executed by the examining machine 115 prior to any loss of connection with a target machine 117 being investigated according to one embodiment of the invention.

In step 200, the client software 116 establishes a secure connection with a desired target machine 117 via the secure server 111. In step 202, the client software 116 identifies a particular device to be acquired, and a range or block of data (data block) from that device. The client software 116 then requests the servlet 118 for the identified data block. The particular device from which data is to be acquired may be, for example, a particular secondary storage device 104 coupled to the target machine. According to one embodiment of the invention, the data block to be acquired is a set of sectors (e.g. 64 sectors) of the identified device.

According to one embodiment of the invention, along with the request for the data block is an identifier, such as, for example, a hash identifier (ID), to be used for identifying a digital signature generation process, such as, for example, a hash process, to be spawned by the servlet 118 for the particular data acquisition. Because there may be multiple digital signature generation processes concurrently being conducted by the servlet for different investigations, the hash ID helps identify the appropriate process.

The servlet 118 at the target machine 117 receives the data block request and the identifier, and proceeds to retrieve the data referenced in the data block request. According to one embodiment of the invention, the servlet computes a digital signature/fingerprint for the currently requested data block, such as, for example, a cyclic redundancy check (CRC), to ensure integrity of the current block of data that is retrieved. The servlet then transmits the requested data block and digital signature of the data block (e.g. CRC data) to the requesting examining machine 115.

In addition to the above, the servlet further engages in an ongoing process of computing the digital signature of the data blocks as each block is acquired by the servlet. Any algorithm conventional in the art such as, for example, an MD5 hashing algorithm, may be used for computing of the digital signature. The digital signature process, hereinafter referred to as a hash process, ultimately results in a digital signature, hereinafter referred to as a hash value, for the entire acquisition, and is used to ensure integrity of all the data retrieved in the acquisition.

In step 204, the client software 116 receives the retrieved data blocks and any associated CRC data.

In step 206, a determination is made as to whether it is time to send a request for an intermediate hash state of the servlet reflective of the data blocks hashed so far. The client software 116 may be configured to periodically transmit the hash state request, such as, for example, every 100 data blocks.

Responsive to the hash state request, the servlet retrieves and transmits the current hash state to the client server. According to one embodiment of the invention, the hash state is represented as 88 bytes of data in the target machine's memory. These 88 bytes of data provide an intermediate representation of the data blocks that have been hashed so far. The intermediate representation will vary based on the hashing algorithm that is used. The hash state information allows the servlet to continue adding data blocks to the hash computation without requiring reprocessing of previously acquired data blocks. Because hashing is a computationally expensive and slow process, the saving of hash states saves resources and computation time.

In step 208, the client software processes the received data block and updates any previously stored hash state with the new hash state.

In step 210, a determination is made as to whether there are any more data blocks that need to be requested from the device being acquired. If the answer is YES, the client software proceeds to request a next set of data blocks from the servlet. If the answer is NO, the client requests the servlet, in step 212, for the final hash value of the processed data blocks representative of the digital signature/fingerprint of all the blocks that were acquired. In step 214, the client software receives the hash value from the servlet.

Figure 3:
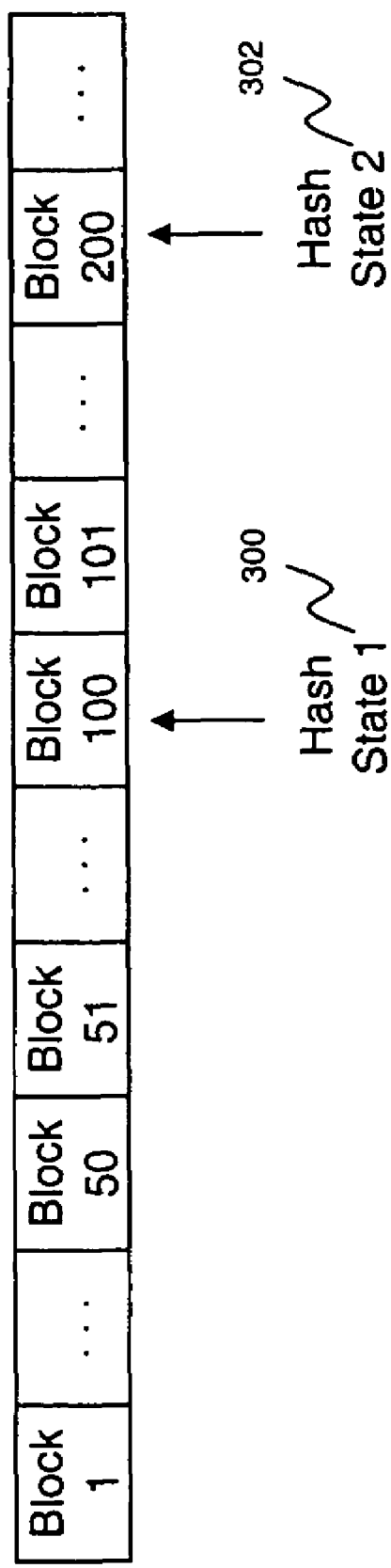
FIG. 3 is a diagramatic representation of data blocks that are retrieved and hashed by a servlet according to one embodiment of the invention.

FIG. 3 is a diagrammatic representation of data blocks that are retrieved and hashed by the servlet according to one embodiment of the invention. In the illustrated example, it is assumed that the client software requests one data block at a time, and that a hash state request is made every 100 data blocks.

In the illustrated example, the client software starts the acquisition process by requesting blocks 1 through 50. The servlet retrieves the requested data blocks, computes a CRC of blocks 1-50, and further engages in a hash of blocks 1-50. The servlet transmits the retrieved data blocks and the CRC information to the client.

Next, the servlet receives a request for blocks 51 through 100 from the client software 116. The servlet retrieves the requested data blocks, computes a CRC of blocks 51 through 100, and adds blocks 51 through 100 to the hash computation. At this point, the client software transmits a request for the hash state and receives hash state 300 of the data hashed so far, that is, blocks 1 through 100. The hash state 300 is saved by the client software in memory.

A new hash state 302 is received by the client software after requesting and/or receiving data block 200 from the servlet. The new hash state 302 represents the hashing of blocks 1 through 200, and replaces hash state 300 currently stored at the client.

Figure 4:
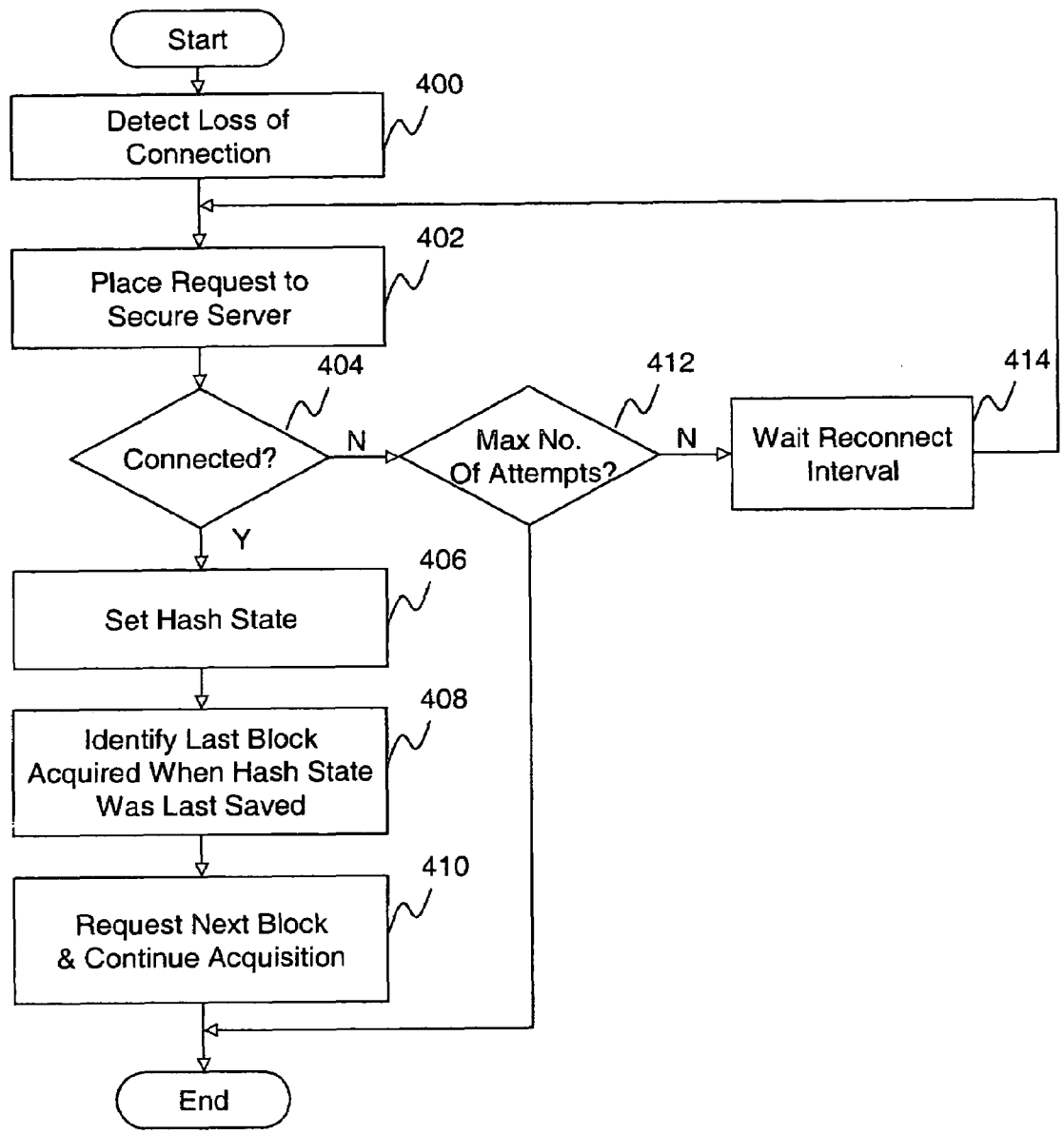
FIG. 4 is a flow diagram of a process executed by a reconnect module for automatically reconnecting and automatically resuming investigation of a target machine according to one embodiment of the invention.

FIG. 4 is a flow diagram of a process executed by the reconnect module 204 for automatically reconnecting and automatically resuming investigation of a target machine according to one embodiment of the invention. In step 400, the reconnect module 204 detects loss of connection with a particular target machine being investigated by the examining machine 115. The loss of connection is detected according to one of various mechanisms conventional in the art. For example, a loss of connection is detected when either a timeout occurs during communication with the target machine or a "close" command is received from the underlying communications protocol.

In step 402, the reconnect module 204 places a request to the secure server for reestablishing connection with the target machine. In this regard, the reconnect module engages in the same steps that are engaged in establishing an initial connection. These steps are described below with respect to FIGS. 7B. According to one embodiment of the invention, the number of times the server attempts to reconnect with the target machine are user configurable.

In step 404, a determination is made as to whether the reconnection was successful. If the answer is NO, a determination is made as to whether a maximum number of auto reconnect attempts were made. If the answer is NO, the reconnect module 204 waits, in step 414, a predetermined reconnect interval time, and returns to step 402 to attempt to reconnect to the target machine.

Otherwise, if the reconnection was successful, the reconnect module 204 proceeds with the automatic reacquisition of data. In this regard, the reconnect module 204, in step 406, sets the hash state of the device 104 being investigated by transmitting the currently stored hash state to the servlet 118. The transmission of this intermediary hash state to the servlet allows the servlet to resume its hashing process from this intermediate state. The servlet need not rehash data that is already reflected in the intermediate hash state.

In step 408, the reconnect module 204 retrieves from memory the last block number (a current position) that was acquired when the hash state was last saved at the examining machine. The reacquisition need only proceed from this point forward and still ensure proper hash calculation of the entire acquisition. Thus, the saved hash state causes reacquisition of at most a portion, but not all, of data already acquired prior to the loss of connection.

Based on information on the current position, the reconnect module sets the position from which data acquisition is to be resumed to a next position following the current position. That is, the next position is a next block number following the last block number that was acquired when the hash state was last saved. Then, in step 410, the reconnect module 204 automatically continues the acquisition process by requesting to acquire the identified next block (e.g. the next 64 sectors) from the device.

Figure 5:
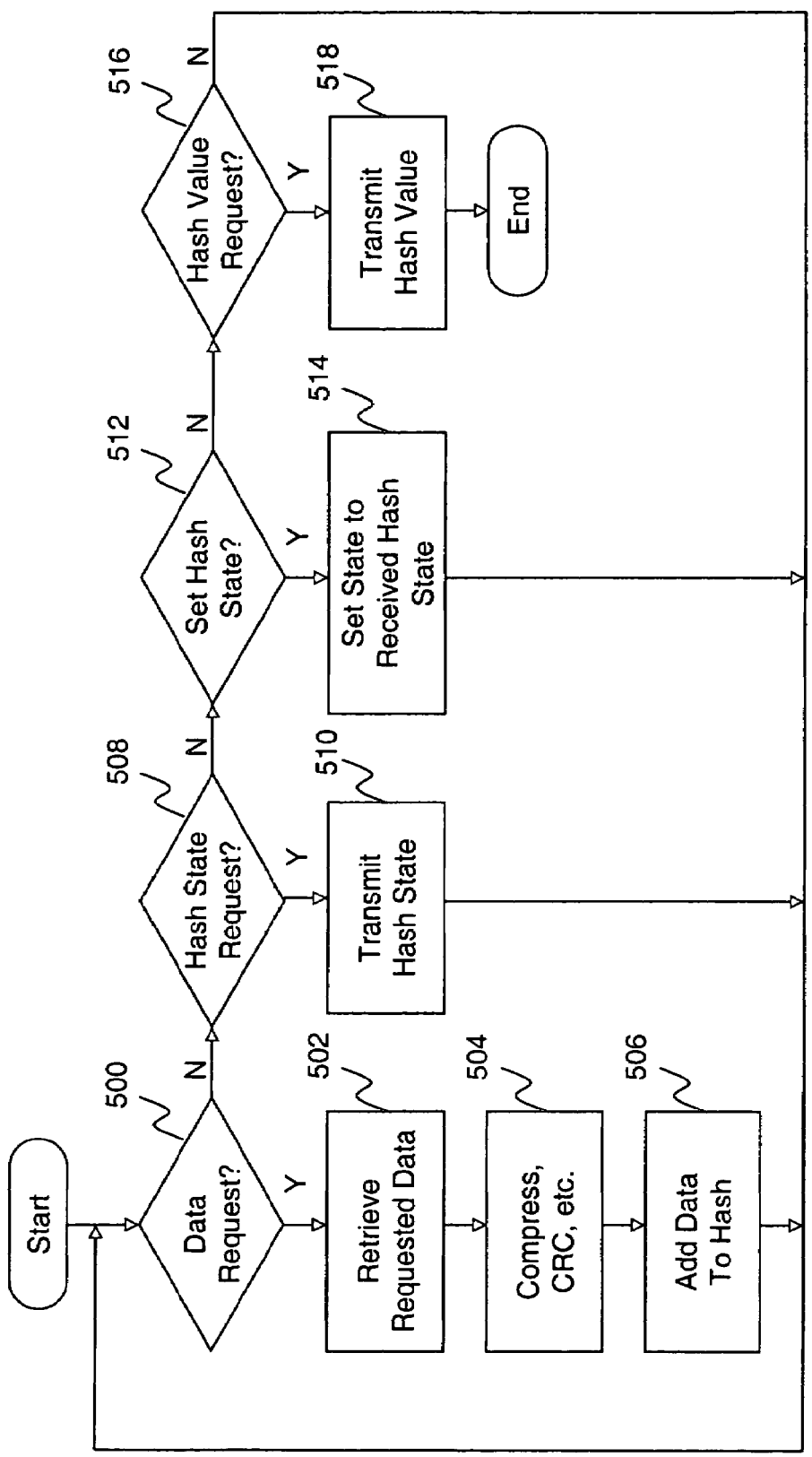
FIG. 5 is a flow diagram of a data acquisition process executed by a servlet based on requests from an examining machine according to one embodiment of the invention.

FIG. 5 is a flow diagram of a data acquisition process executed by the servlet 118 based on requests from the examining machine according to one embodiment of the invention. The data acquisition process is the same from the perspective of the servlet regardless of whether the acquisition is from an initial connection or a reacquired connection. That is, according to one embodiment of the invention, the servlet simply responds to the examining machine's requests and commands, and is unaware that an initial connection may have been lost and/or reacquired.

In this regard, in step 500, the servlet determines whether a data request was received from a particular examining machine. If the answer is YES, the servlet, in step 502, retrieves the requested data from a particular secondary storage device 104. In step 504, the servlet compresses the retrieved data and/or performs a CRC of the data. In step 506, the data is added to an ongoing hash calculation. In this regard, the servlet uses the current hash state in memory to add to it the hash calculation of the newly retrieved data. The new hash state represents the hash calculation of the data blocks of a particular file that have been retrieved so far.

In step 508, a determination is made as to whether a hash state request was received from the examining machine. If the answer is YES, the servlet, in step 510, transmits to the examining machine the hash state currently stored in its memory.

In step 512, a determination is made as to whether a request was received to set the servlet's hash state. According to one embodiment of the invention, such a request is transmitted by the reconnect module 204 upon reestablishing connection with the servlet after having lost a previous connection. In step 514, any hash state that may be saved in the servlet's memory is replaced with the hash state that is received from the examining machine.

In step 516, a determination is made as to whether a hash value was requested. If the answer is YES, the acquisition of a current file is complete, and the final hash value is transmitted to the examining machine in step 518. This hash value represents the digital signature of the entire file that was acquired, and may be used to ensure the integrity of the data in the file.

Although the above embodiments are directed to acquiring all data stored in a secondary storage device 104 on a block-by-block basis, a person of skill in the art should recognize that the client software 116 may acquire specific files stored in the secondary storage device. According to this embodiment, the reconnect module 204 is configured to automatically restart acquisition of a particular file that was being acquired when the connection was lost. In this regard, the client software 116 maintains for each secondary storage device 104, a file directory of files stored in the device and file properties associated with each file. The file properties may include, but are not limited to file size, one or more locations on the secondary device where one or more blocks of file data is stored, information on whether the file is a regular, encrypted, or compressed file, and/or any information for accessing, decrypting, and/or decompressing the file (e.g. decryption keys). Any addressing scheme may be used for specifying the location of one or more blocks of file data, such as, for example, cylinder-head-sector addressing, logical block addressing, or the like. Acquisition of a particular file is then requested based on the stored file properties.

Figure 6:
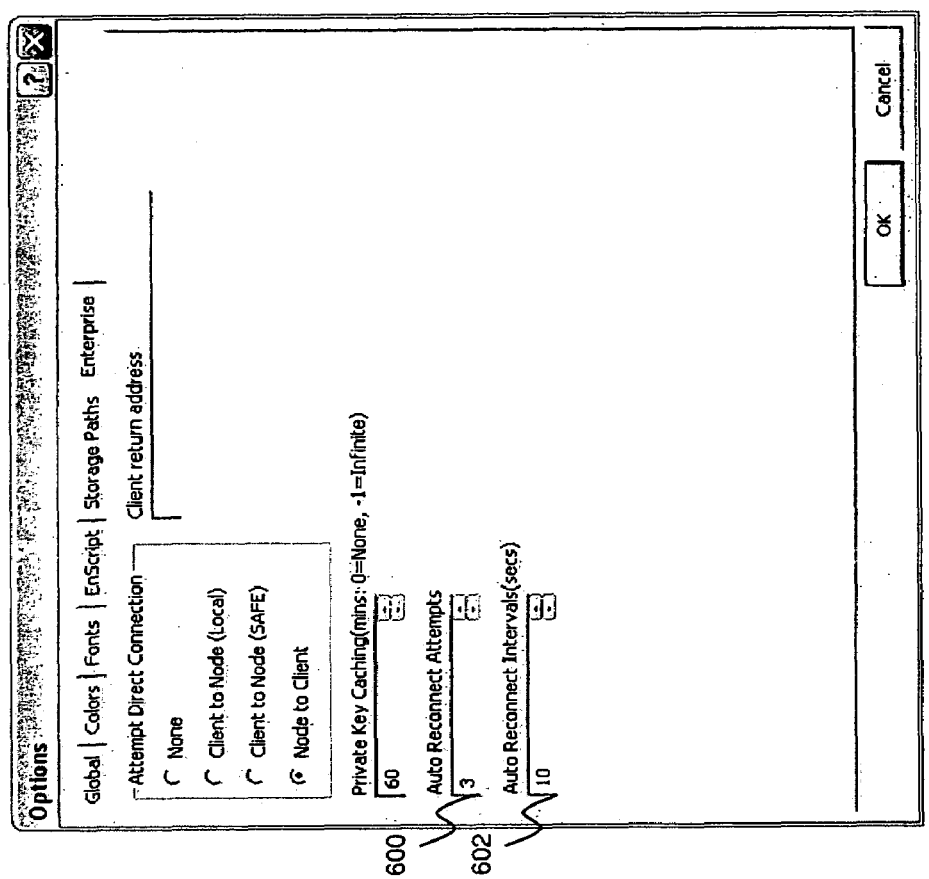
FIG. 6 is a graphical user interface provided by a client software for customizing certain parameters of a reconnect module according to one embodiment of the invention.

FIG. 6 is a graphical user interface provided by the client software 116 for customizing certain parameters of the reconnect module 204 according to one embodiment of the invention. The interface allows an examiner to indicate, via manipulation of field 600, the number of reconnection attempts to be made by the reconnect module after a connection is lost, in order to automatically reconnect to the target device being investigated.

The graphical user interface further allows an examiner to indicate, via manipulation of field 602, the time interval between each reconnection attempt.

Figure 7A:
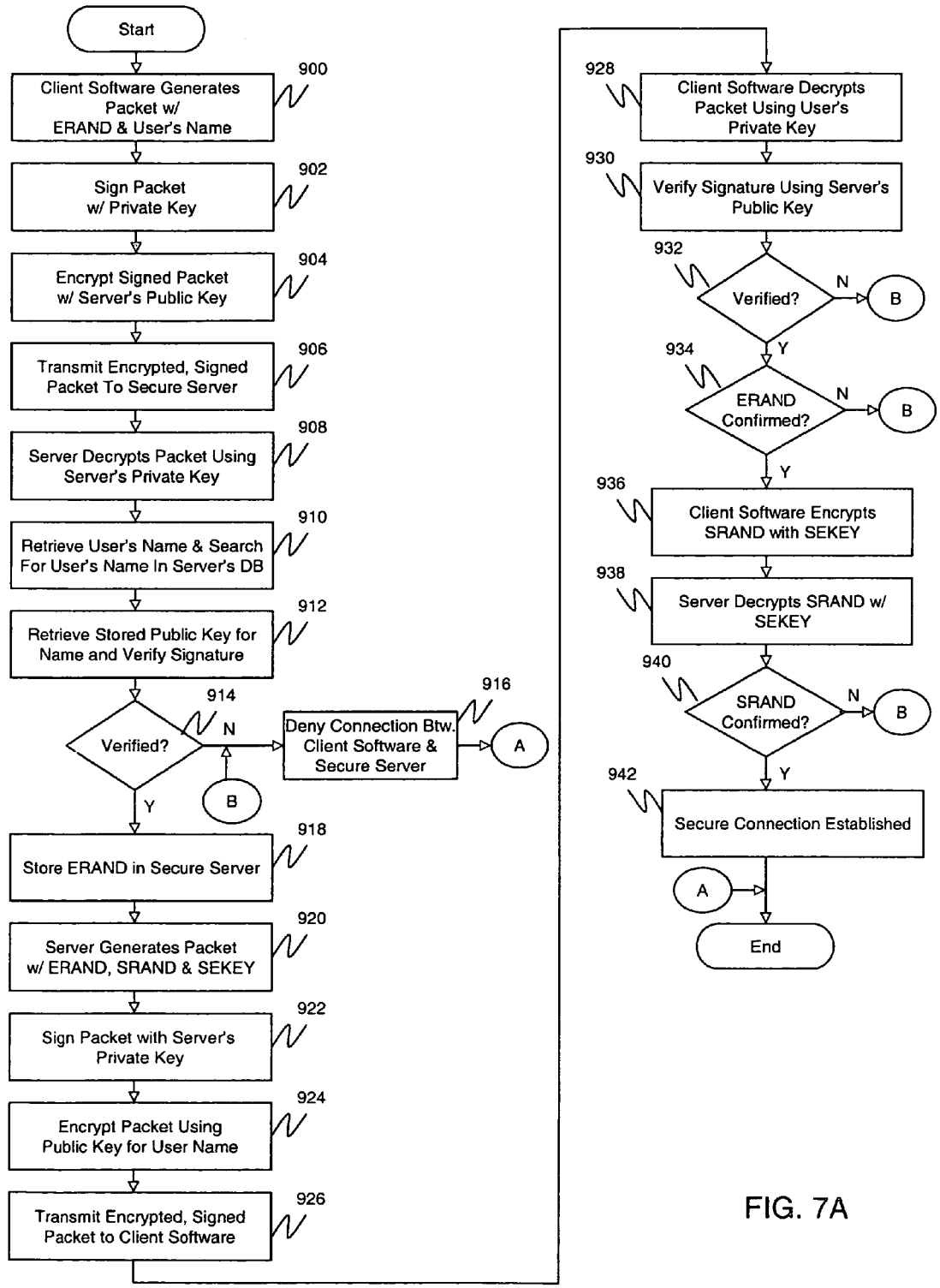
FIG. 7A is a flow diagram of a process for establishing secure communication between an examining machine and a secure server according to one embodiment of the invention.

FIG. 7A is a flow diagram of a process for establishing secure communication between the examining machine 115 and the secure server 111 according to one embodiment of the invention. The client software 116 or reconnect module 204 (hereinafter collectively referred to as the client software) resident in the examining machine 115 is invoked for establishing the secure communication. In general terms, the client software, in step 900, generates an examiner's random number "Erand" and includes it into a packet along with the examiner's user name. In step 902, the client software signs the packet with a user authentication private key as is understood by those of skill in the art. In step 904, the client software encrypts the signed packet with the secure server's public key according to conventional mechanisms, and transmits the encrypted, signed packet to the secure server 111 in step 906.

In step 908, the secure server 111 receives the packet and invokes its computer investigation software 109 to decrypt the packet using the server's private key. In step 910 the software 109 retrieves the examiner's user name from the packet and searches the server's database for a match. The matched name in the server's database includes a public user authentication key which is used in step 912 to verify the user's signature on the packet according to conventional mechanisms. If the signature is not verified, as determined in step 914, the client software cannot be authenticated and a connection between the client software and the secure server is denied in step 916.

If, however, the signature is verified, the client software may be authenticated, and the computer investigation software 109 stores the examiner's random number in step 918. In step 920, the processor generates its own server random number "Srand" and a server-to-examiner session encryption key "SEkey" to be used to encrypt future communications between the server and the examiner. These values, as well as the original examiner's random number are signed with the server's private key in step 922, encrypted with the user's public key in step 924, and transmitted to the client software in step 926.

In step 928, the client software 116 receives the packet from the secure server and decrypts it using the user's private key. In step 930, the client software verifies the server's signature with the server's public key according to conventional mechanisms. In step 932, a determination is made as to whether the signature may be verified. If the answer is YES, the server is authenticated, and the client software verifies the examiner's random number that is transmitted by the server to confirm that it is, in fact, the same number that was sent to the server. If the number may be confirmed, as is determined in step 934, the examiner creates another packet to send back to the server 111. This packet includes the server random number which is encrypted, in step 936, with the server-to-examiner session key. The encrypted packet is then transmitted to the server.

In step 938, the server's computer investigation software 109 decrypts the packet containing the server random number with the server-to-examiner session key. If the received server random number is the same number originally generated and sent to the client software as is determined in step 940, the number is confirmed, and a secure connection is established in step 942. The process for establishing a secure connection between the client software and the secure server 111 is described in more detail in the above-referenced U.S. Pat. No. 6,792,545.

Once a secure connection is established, an examiner may use its client software 116 to request investigation of the target machines across the network in support of incident response, information auditing, and forensic discovery. The secure server 111 authorizes and securely brokers requests and communications from the client software to the target machines. The communication between the server and the client software is encrypted using the server-to-examiner session encryption key.

Figure 7B:
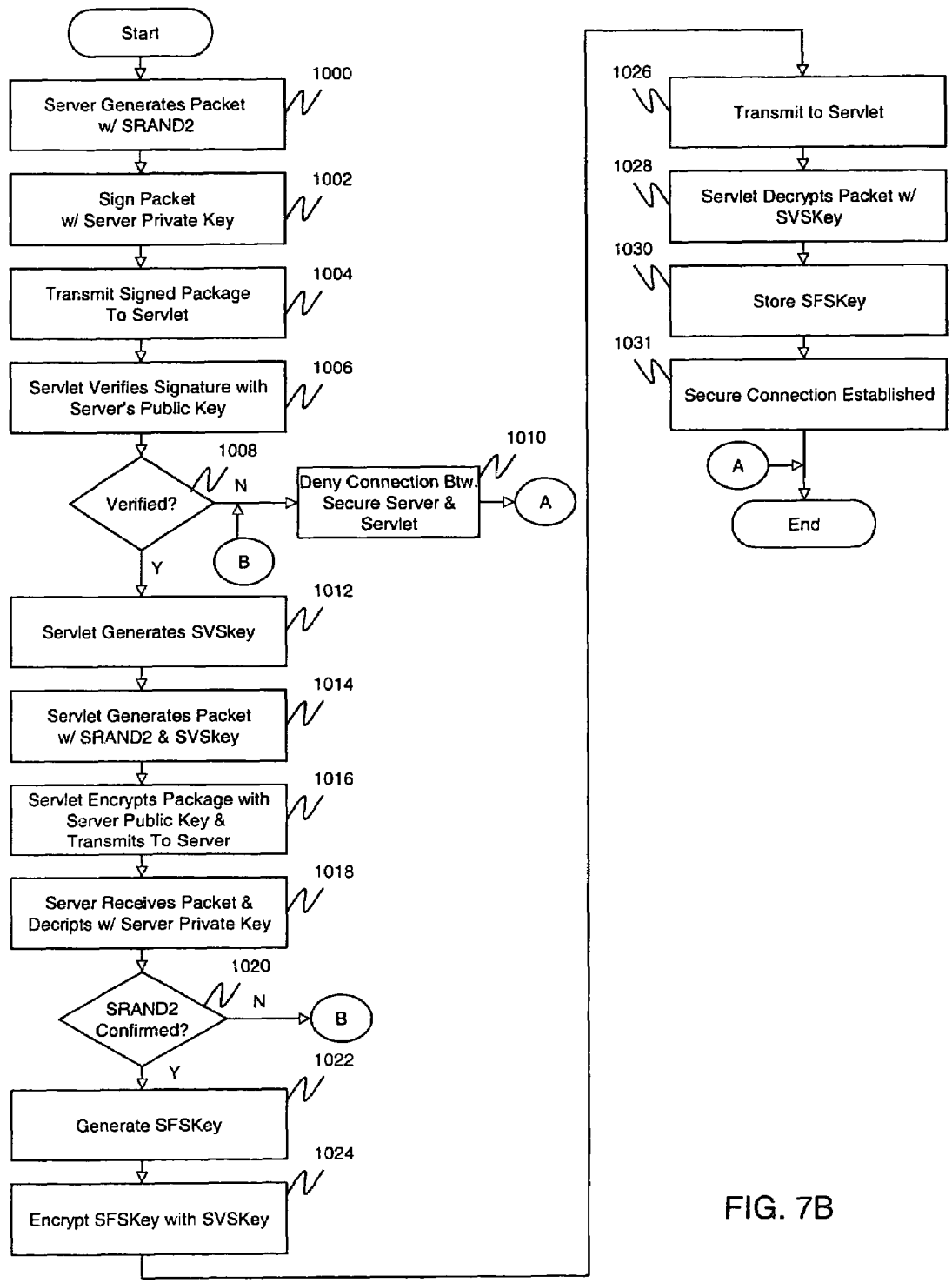
FIG. 7B is a flow diagram of a process for establishing a secure communication between a secure server and a servlet according to one embodiment of the invention.

FIG. 7B is a flow diagram of a process for establishing a secure communication between the secure server 111 and the servlet 118 according to one embodiment of the invention. A number of such secure communications may be established concurrently.

In step 1000, the server's computer investigation software 109 generates a second server random number "Srand2," and signs the packet with the server's private key in step 1002. In step 1004, the software 109 transmits the signed packet to the servlet.

The servlet receives the packet signed with the second server random number, and in step 1006, verifies the signature with the server's public key. If the signature cannot be verified, as is determined in step 1008, a safe connection between the secure server 111 and the servlet 118 is denied in step 1010.

If, however, the server's signature is verified, the servlet generates a servlet-to-server session encryption key in step 1012 and inserts it into a packet in step 1014 along with the second server random number. The servlet encrypts the packet in step 1016 with the server's public key, and transmits the packet to the server 111.

In step 1018, the server's computer investigation software 109 receives the encrypted packet and decrypts it with the server's private key. The processor further confirms in step 1020, whether the second server random number is the same number that was originally sent to the servlet. If the answer is YES, the processor generates a server-to-servlet session encryption key in step 1022, and encrypts the server-to-servlet session encryption key with the servlet-to-server session encryption key in step 1024. In step 1026, the encrypted packet is transmitted to the servlet.

In step 1028, the servlet decrypts the packet with the servlet-to-server session key, and stores the server-to-servlet session key in step 1030. In step 1031, a secure connection is established, and all subsequent data exchanges between the server and the servlet are encrypted using the server-to-servlet session key. The establishment of a secure connection between the secure server 111 and the servlet 118 is described in more detail in the above-referenced U.S. Pat. No. 6,792,545.

Once the server 111 has successfully established secure connections with the examining machine 115 and one or more servlets, the examining machine 115 and the servlets may communicate directly in effectuating searches of dynamic and/or static data stored in the target devices.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for automatically reconnecting to a target machine and resuming acquisition of data stored for the target machine, the method comprising:
   establishing connection with the target machine;
   initiating acquisition of data from the target machine;
   detecting loss of connection with the target machine during the acquisition of data;
   automatically reconnecting to the target machine responsive to the detected loss of connection;
   identifying a data position from which the acquisition of data is to be resumed responsive to the reconnection to the target machine; and
   automatically resuming the acquisition of data starting from the identified data position.

2. The method of claim 1, further comprising:
   periodically receiving from the target machine an intermediate representation of a digital signature associated with the data acquisition, the intermediate representation being based on data acquired up to a current position; and
   storing the intermediate representation in memory.

3. The method of claim 2 further comprising:
   responsive to the detected loss of connection, identifying the current position;
   setting the data position to a next position following the current position;
   retrieving the stored intermediate representation;
   transmitting the intermediate representation to the target machine; and
   requesting data associated with the next position.

4. The method of claim 2, wherein the intermediate representation is a hash state for data acquired up to the current position.

5. The method of claim 4, wherein the target machine receives the hash state and updates the hash state based on a hash calculation of the data associated with the next position.

6. The method of claim 1 further comprising establishing a secure communication with the target machine including:
   receiving a first encryption key generated by the target machine;
   generating a second encryption key; and
   transmitting the second encryption key to the target machine, wherein the second encryption key is encrypted via the first encryption key.

7. The method of claim 6 further comprising receiving from the target machine data encrypted using the second encryption key.

8. An examining machine automatically reconnecting to a target machine and resuming acquisition of data stored in a device coupled to the target machine, the examining machine comprising:

a processor; and a memory operably coupled to the processor and storing program instructions therein, the processor being operable to execute the program instructions, the program instructions including:

establishing connection with the target machine;

initiating acquisition of data from the target machine;

detecting loss of connection with the target machine during the acquisition of data;

automatically reconnecting to the target machine responsive to the detected loss of connection;

identifying a data position from which the acquisition of data is to be resumed responsive to the reconnection to the target machine; and automatically resuming the acquisition of data starting from the identified data position.

9. The examining machine of claim 8 further including a memory coupled to the processor, the program instructions further including:

periodically receiving from the target machine an intermediate representation of a digital signature associated with the device, the intermediate representation being based on data acquired up to a current position; and storing the intermediate representation in the memory.

10. The examining machine of claim 9, wherein the program instructions further include:

responsive to the detected loss of connection, identifying the current position;

setting the data position to a next position following the current position;

retrieving the stored intermediate representation;

transmitting the intermediate representation to the target machine; and requesting data associated with the next position.

11. The examining machine of claim 9, wherein the intermediate representation is a hash state for data acquired up to the current position.

12. The examining machine of claim 11, wherein the target machine receives the hash state and updates the hash state based on a hash calculation of the data associated with the next position.

13. The examining machine of claim 8, wherein the program instructions further comprise establishing a secure communication with the target machine including:

receiving a first encryption key generated by the target machine;

generating a second encryption key; and transmitting the second encryption key to the target machine, wherein the second encryption key is encrypted via the first encryption key.

14. The examining machine of claim 13, wherein the program instructions further include receiving from the target machine data encrypted using the second encryption key.

15. An examining machine automatically reconnecting to a target machine and resuming acquisition of data stored for the target machine, the examining machine comprising:

means for establishing connection with the target machine;

means for initiating acquisition of data from the target machine;

means for detecting loss of connection with the target machine during the acquisition of data;

means for automatically reconnecting to the target machine responsive to the detected loss of connection;

means for identifying a data position from which the acquisition of data is to be resumed responsive to the reconnection to the target machine; and means for automatically resuming the acquisition of data starting from the identified data position.

16. The examining machine of claim 15 further comprising:

means for periodically receiving from the target machine an intermediate representation of a digital signature associated with the device, the intermediate representation being based on data acquired up to a current position; and means for storing the intermediate representation.

17. The examining machine of claim 16 further comprising:

means responsive to the detected loss of connection for identifying the current position;

means for setting the data position to a next position following the current position;

means for retrieving the stored intermediate representation;

means for transmitting the intermediate representation to the target machine; and means for requesting data associated with the next position.

18. The examining machine of claim 16, wherein the intermediate representation is a hash state for data acquired up to the current position.

19. The examining machine of claim 18, wherein the target machine receives the hash state and updates the hash state based on a hash calculation of the data associated with the next position.

20. The examining machine of claim 15 further comprising means for establishing a secure communication with the target machine including:

means for receiving a first encryption key generated by the target machine;

means for generating a second encryption key; and means for transmitting the second encryption key to the target machine, wherein the second encryption key is encrypted via the first encryption key.

21. The examining machine of claim 20 further comprising:

means for receiving from the target machine data encrypted using the second encryption key.

* * * * *